(12) United States Patent
Dupuy

(10) Patent No.: US 11,154,038 B2
(45) Date of Patent: Oct. 26, 2021

(54) PORTABLE MEWS APPARATUS

(71) Applicant: Michael Dupuy, Middleburg, PA (US)

(72) Inventor: Michael Dupuy, Middleburg, PA (US)

(*) Notice: Subject to any disclaimer, the term of this patent is extended or adjusted under 35 U.S.C. 154(b) by 247 days.

(21) Appl. No.: 16/101,587

(22) Filed: Aug. 13, 2018

(65) Prior Publication Data
US 2020/0045939 A1 Feb. 13, 2020

Related U.S. Application Data

(60) Provisional application No. 62/559,203, filed on Sep. 15, 2017.

(51) Int. Cl.
A01K 31/00 (2006.01)
A01K 31/16 (2006.01)
A01K 31/12 (2006.01)
A01K 45/00 (2006.01)

(52) U.S. Cl.
CPC .............. A01K 31/16 (2013.01); A01K 31/12 (2013.01); A01K 45/002 (2013.01)

(58) Field of Classification Search
CPC .......... A01K 31/00; A01K 31/16; A01K 1/00; A01K 1/0035; A01K 1/03; A01K 1/031
USPC ........ 119/330, 416–418, 428, 436, 437, 452, 119/453, 459, 482, 483
See application file for complete search history.

(56) References Cited

U.S. PATENT DOCUMENTS

| | | | | |
|---|---|---|---|---|
| 3,556,055 A | * | 1/1971 | Wenger | A01K 1/00 119/436 |
| 4,723,512 A | * | 2/1988 | Margolis | A01K 1/035 119/455 |
| 4,953,502 A | * | 9/1990 | Hoover | A01K 15/025 119/416 |
| 5,186,122 A | * | 2/1993 | Phillips | A01K 1/03 119/474 |
| 5,662,069 A | * | 9/1997 | Smith | A01K 13/001 119/665 |
| 6,276,298 B1 | * | 8/2001 | Welsh | A01K 39/0113 119/52.3 |
| 6,311,643 B1 | * | 11/2001 | Christian | A01K 31/06 119/428 |
| 6,460,486 B1 | * | 10/2002 | Powers | A01K 1/0245 119/452 |
| 6,832,580 B2 | * | 12/2004 | Marchioro | A01K 1/0245 119/452 |
| 7,156,050 B2 | * | 1/2007 | Scott | A01K 31/14 119/431 |
| 7,458,336 B2 | * | 12/2008 | Eu | A01K 1/033 119/163 |
| 7,487,744 B1 | * | 2/2009 | Goldberg | A01K 1/031 119/453 |
| 8,276,544 B2 | * | 10/2012 | Seltzer | A01K 1/0236 119/496 |

(Continued)

Primary Examiner — Richard T Price, Jr.
(74) Attorney, Agent, or Firm — Maya Cheriyan; Eckert Seamans Cherin & Mellott, LLC

(57) ABSTRACT

A modular apparatus for housing animals comprising a wall unit, a window unit, a roof unit, a skylight unit, a door unit, a bath unit, an observation unit, and a port unit, and a fastening system adapted to releasibly interlock said units to form a housing suitable for animals. The apparatus can be assembled at a first location and subsequently disassembled and reassembled at a second location. Among the animals are raptors and other avian species.

13 Claims, 12 Drawing Sheets

(56) References Cited

U.S. PATENT DOCUMENTS

2005/0284404 A1* 12/2005 Pomakoy-Poole .. A01K 1/0245
119/497
2008/0236510 A1* 10/2008 Silverman .............. A01K 31/08
119/479

* cited by examiner

|̈ Universal Fastening System Component
¨| Universal Fastening System Component
L Universal Fastening System Component
⌐ Universal Fastening System Component
T Universal Fastening System Component
⊥ Universal Fastening System Component
|- Universal Fastening System Component
-| Universal Fastening System Component

PORTABLE MEWS APPARATUS

CROSS-REFERENCE TO RELATED APPLICATION

This present application claims benefit of priority from U.S. Provisional Application Ser. No. 62/559,203, filed Sep. 15, 2017 entitled "PORTABLE MEWS".

FIELD OF THE INVENTION

The present invention relates generally to a housing assembly comprising of a collective of modular fixtures, structures, and components that may interlock and be exchanged, particularly by avian enthusiasts and the enthusiast's charge.

BACKGROUND OF THE INVENTION

Presently, the manner of erecting a housing for avian occupants conducive to their needs, particularly a mew for the practice of falconry, has been grounded in stationary domiciles that once erected are stationary and difficult to alter, fix, or replace without considerable and exhaustive efforts in the aforementioned. Typically, these structures are constructed of wood, screens, metals, and other materials of a non-homogeneous assembly where constructs would require partial or total deconstruction to introduce newer features or replace dilapidated structures. Despite this, while reconstitution of the domicile is undertaken, the occupant still requires a suitable habitat to occupy. Hence the act of erecting a newer feature might just as well be undertaken in total and leaving the initial structure until completion, lest the occupant have less than suitable conditions or pose risk of running off. It is the object of the present invention to circumvent this tedious task of domicile construction and revision by introducing a universal, modular system of components that may be constructed into an assembly of variable size to support any number of needs of the occupant with minimal time. By presenting the individual with a universal system of engagement between the components, the enthusiast would be capable of picking and choosing what is best for the occupant not only at the initial stage of construction, but any developments in the span of operation such as allowing for separate, discretized accommodations, breeding and nesting, the scale of the occupant, and so on. The present invention would further permit the modular repair of the structure without requiring costly, timely, and often intrusive invasion of the occupants for prolonged periods of time such as where the wall surrounding a doorway or window has suffered damage requiring replacement of both the wall and the adjoined structure. The plurality of components would circumvent this by rendering every component replaceable as a building block individually, only requiring the removal of a single element such as the lower wall as opposed to everything adjacent thereto. A further benefit to the homogenization of the plurality of components lies in the portability of transport of the structure. Where before, the structure as a whole would have to be transported or abandoned entirely, the domicile may be systematically deconstructed into the plurality of components and packaged with greater ease. By operating through a plurality of fasteners, the plurality of components would thus be equipped to expedite erection of the domicile, the additions thereto, with minimal intrusion or disruption to the occupant therein, and further the ease of deconstruction and transportation thereafter.

DETAIL DESCRIPTIONS OF THE INVENTION

Figure 1:
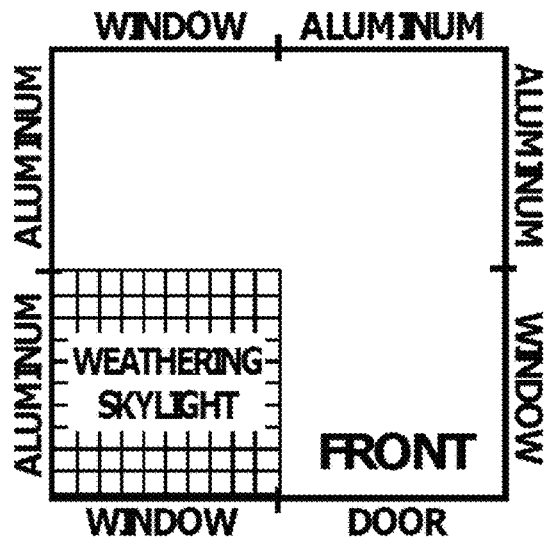
FIG. 1 is a series of depictions of the domicile in a simple configuration where the top most depiction details a top sectional view of the assembly while the bottom most depiction details a perspective view of the domicile assembly where the wall units, window units, and door unit are observed to be engaged through the rectilinear perimeter structure of each and further where the wall units may be produced in a plurality of scales.
Figure 1:
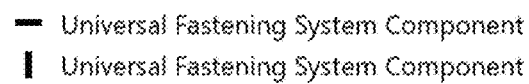
Figure 1:
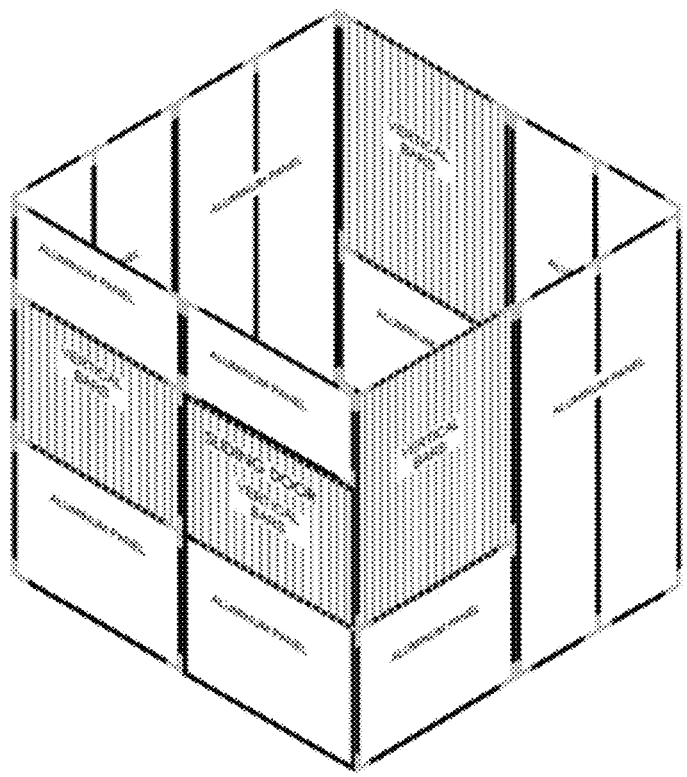
Figure 1:

All illustrations of the drawings are for the purpose of describing selected versions of the present invention and are not intended to limit the scope of the present invention.

The invention is generally a modular domicile, particularly for avian occupants that comprises a plurality of components that further comprises a universal fastening system, a wall unit (or a plurality thereof), a window unit (or a plurality thereof), a roof unit (or a plurality thereof), a skylight unit (or a plurality thereof), a door unit, a bath unit, a plurality of perch units, a nesting unit, a social engagement unit, an observation unit (or a plurality thereof), and a port unit. The wall unit further still comprises a wall panel. The window unit further still comprises a plurality of window rods. The roof unit further still comprises a roof panel. The skylight panel further still comprises a porous mesh. The door unit further still comprises a door track, and a door panel that itself still further comprises a plurality of door rollers and an optional plurality of door bars. The bath unit further still comprises a bath platform, and a bath panel. The bath platform still further comprises a removable bath tub, while the bath panel still further comprises a bath closure. The plurality of perch units still further comprises a protrusion perch unit, and a platform perch unit. The protrusion perch unit still further comprises a pro-perch fastening bracket. The nesting unit further still comprises a nesting housing that itself still further comprises a plurality of nesting closures that itself further comprises a nesting closure track. The social engagement unit further still comprises a social port, a social track, a social panel, and a plurality of sliding bars. The observation unit further still comprises a plurality of window bars, and an observation barrel. The plurality of window bars still further comprises a window bar void that itself further comprises a plurality of window protrusions. The observation barrel still further comprises a plurality of observation apertures. Lastly the port unit further still comprises a port platform, a port panel, and a transport box. Where the port panel still further comprises a port aperture, and a port closure.

In reference to FIGS. 1-11, the domicile is a preferably rectilinear housing that would house a number of occupants corresponding with the configuration and assembly of the plurality of components of various scale with a preferably uniform material consistent throughout. Formed in an assembly to constitute the domicile is the plurality of components that would be preferably possessed of a uniform material primarily such as metals, plastics, rubbers and so on where further secondary materials may be intermittently applied to individual components on a case by case basis such as ceramics, glass, organic materials, and so on for the various units. The plurality of components would in respect be equivalent to a plurality of units that may be modularly engaged by a universal fastening system.

The universal fastening system would be present on every individual component or unit in the plurality of components and would be ergonomically distributed where the smallest component would dictate the spacing and arrangement of the fastening points in the fastening system. Such as where the window unit would operate on a preferable count of two fastening points that are located at or near the outermost corner surfaces of the window unit constituting a total of eight to the window unit itself while an adjacent wall unit would possess anywhere between one to three clusters of fastening points along a single edge as dictated by the arrangement of fastening points on the window unit. Other configurations may be used however such as but not limited to: clusters of one or more fastening points of the least complicated or elongated structure that is thus dictating and translated to components of twice, thrice, or greater size along a common adjacent edge; A plurality of slots that permit modular assignment of a plurality of conventional fasteners such as bolts to be secured therein, and so on. The means of fastening within the universal fastening system would preferably be constituted of a conventional plurality of apertures and fasteners such as bolts to be secured therein, although other means of fastening may be employed such as, but not limited to: snap fits, self-locating geometry, magnetics, and other fastening means that; when removed, are non-destructive requisite.

Preferably constituted of a rectilinear geometry with a rigid perimeter of material and a hollow cavity therein is the wall unit that would further be preferably non-descript in size, but generally proportional to the individual component least in scale. The wall unit in the primary form would preferably be a single or double paneled structure that possesses a longer longitudinal dimension than its lateral dimension and capable of engagement to any individual component on all exterior facing surfaces of the perimeter structure through the universal fastening system. Spanning between the interior facing surfaces of the perimeter structure of the wall unit is the wall panel that is preferably either a single or double panel construction that is further rigidly affixed to the interior surfaces or edges of the perimeter structure. The wall panel may be a solid uninterrupted plane of rigid, opaque material, or optionally possessed of a plurality of fastening means in conformity with the universal fastening system that would allow smaller individual components to engage readily with the interior facing surfaces of the wall and affixed thereon.

The window unit, another individual component structure of the plurality of components, would be generally employed to permit the occupant to observe the exterior environment and likewise those on the exterior to view the occupant, or even facilitate inter-domicile observation between a plurality of occupants within a plurality of adjacent domiciles. Similar to the wall unit, the window unit would preferably possess a rectilinear perimeter structure of a similar rigidity and complementing, if not dictating arrangement of fastening points correspondent to the universal fastening system. The window unit would further preferably in a similar respect permit the universal fastening system to be present and engaged on all exterior facing surfaces of the perimeter structure in a non-descript arrangement. Spanning between two parallel and opposing interior surfaces of the perimeter structure is the plurality of window rods that would preferably be comprised of a cylindrical and further preferable hollow construction that enables the observation between the interior of the domicile and the environment through the plurality of window rods. Optionally, the plurality of window rods may be outfitted with a glass intermediately spanning the rectilinear voids between edges of the window unit and pairs of window rods to moderate the temperature, wind, heat, or other conditions that would otherwise permeate into the domicile.

In reference to FIGS. 1-5, located at the top of the domicile and likewise preferably formed of a similar basal rectilinear perimeter structure is the roof unit. The roof unit would preferably be formed of a substructure that orients the roof at an angle to mitigate the collection of water, snow, and other plummeting articles that would impact or slowly deform an otherwise flat roof. The slant produced thereof would be created through a dominant roof panel and a plurality of lesser panels that leave minimal gap between adjacent roof units and other components of the plurality of components to minimize exposure of the occupant to the environment. The roof unit as the substructures before it, would utilize the same universal fastening system along the bottom facing surfaces of the perimeter structure with an optional presence along the lateral sides to facilitate engagement with adjacent roof units were a plurality necessary. Forming the top-most structure of the domicile is the roof panel that would preferably be upheld by a plurality of lesser roof panels that orient the dominant roof panel at a slight angle to the earth to prevent the collection of precipitation and debris thereon. However, in the absence of the plurality of lesser roof panels, the dominant roof panel may be secured exclusively to the perimeter structure in a manner similar to the wall unit.

Figure 4:
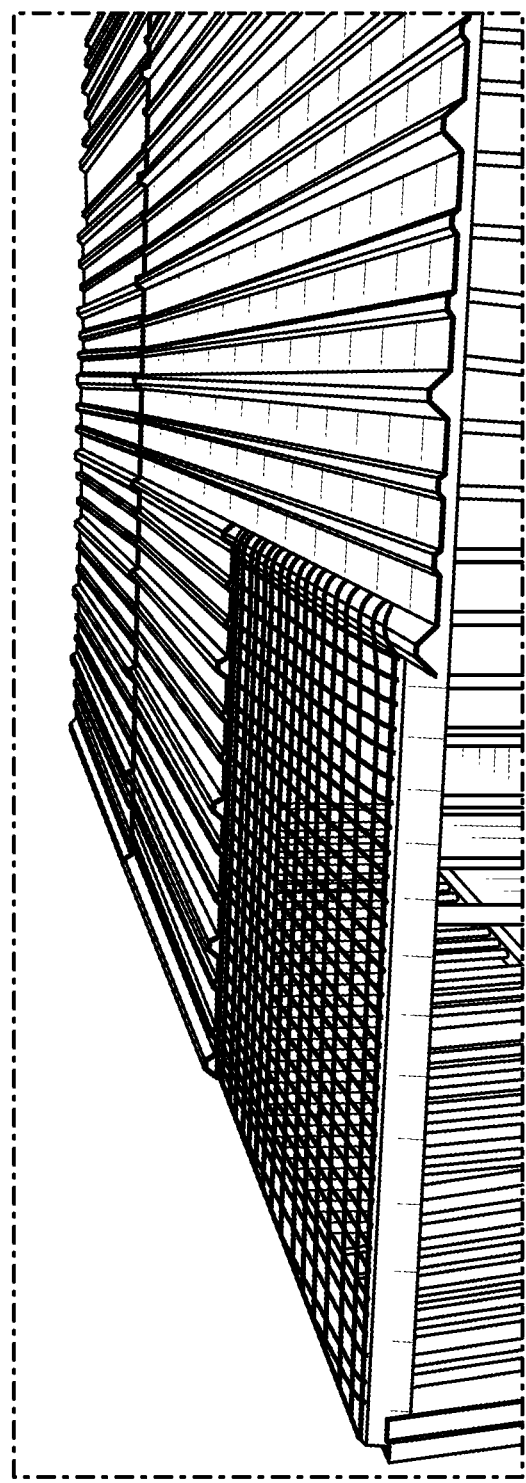
FIG. 4 is a depiction of a plurality of flat roof panels in connection to a skylight unit and the porous mesh is observed as well.
Figure 5:
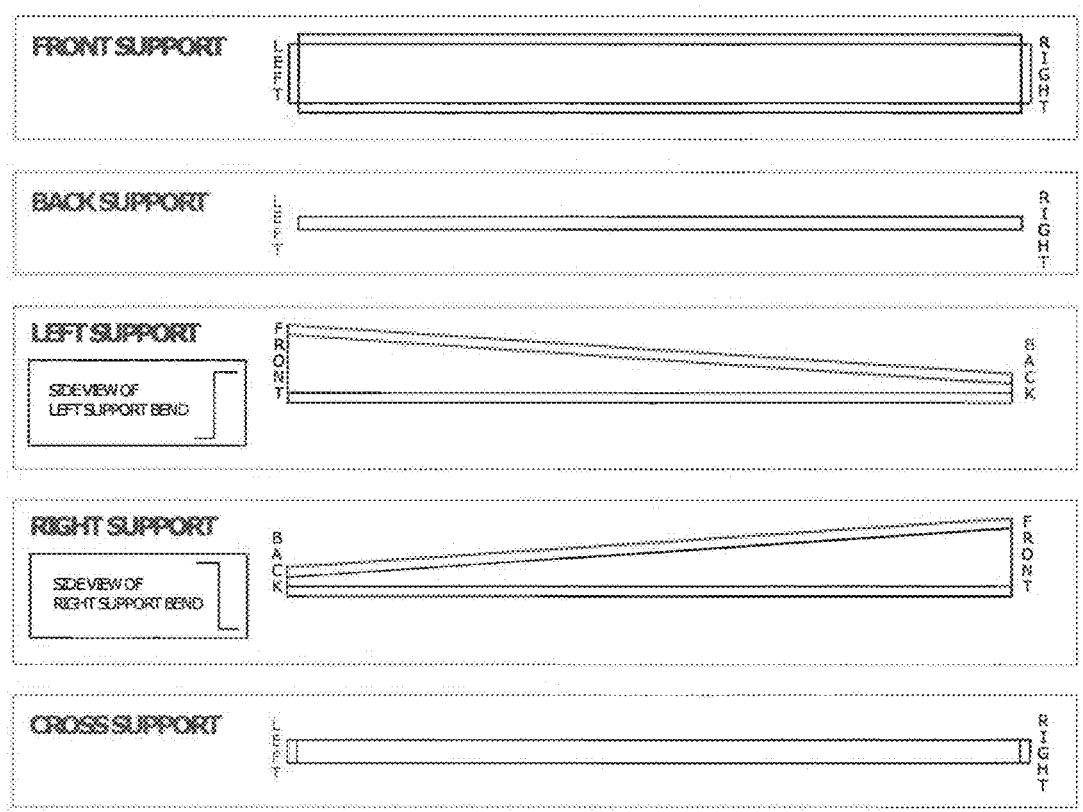
FIG. 5 is a series of depictions concerning the lesser roof panels that would be necessary to produce the sloped roof of FIG. 1-3.

In reference to FIG. 4, able to be located at a height coincident with the roof panel or lower is the skylight unit that would be constituted of its own individual perimeter unit disparate of the roof unit or wall unit. The skylight unit would preferably be constructed in a similar fashion as the window unit in scale and the placement of the universal fastening system points. The points thereof preferably on two exterior and adjacent surfaces on the perimeter structure, totaling eight surfaces, to allow engagement to a lower adjacent wall unit, window unit, or door unit, and adjacent height coincident roof unit. The skylight unit would permit the exterior environment and precipitation to filter into the domicile in a controlled manner, permitting passage of sunlight, rain, snow, and other conventional seasonal debris. The grounds for which are to expose the occupant to the elements in a controlled manner or offer regular environmental interaction in a controlled setting. Spanning between the interior facing surfaces of the perimeter structure of the skylight unit is the porous mesh that would permit the passage of smaller environmental articles but restrict the escape or passage of the occupant.

Figure 2:
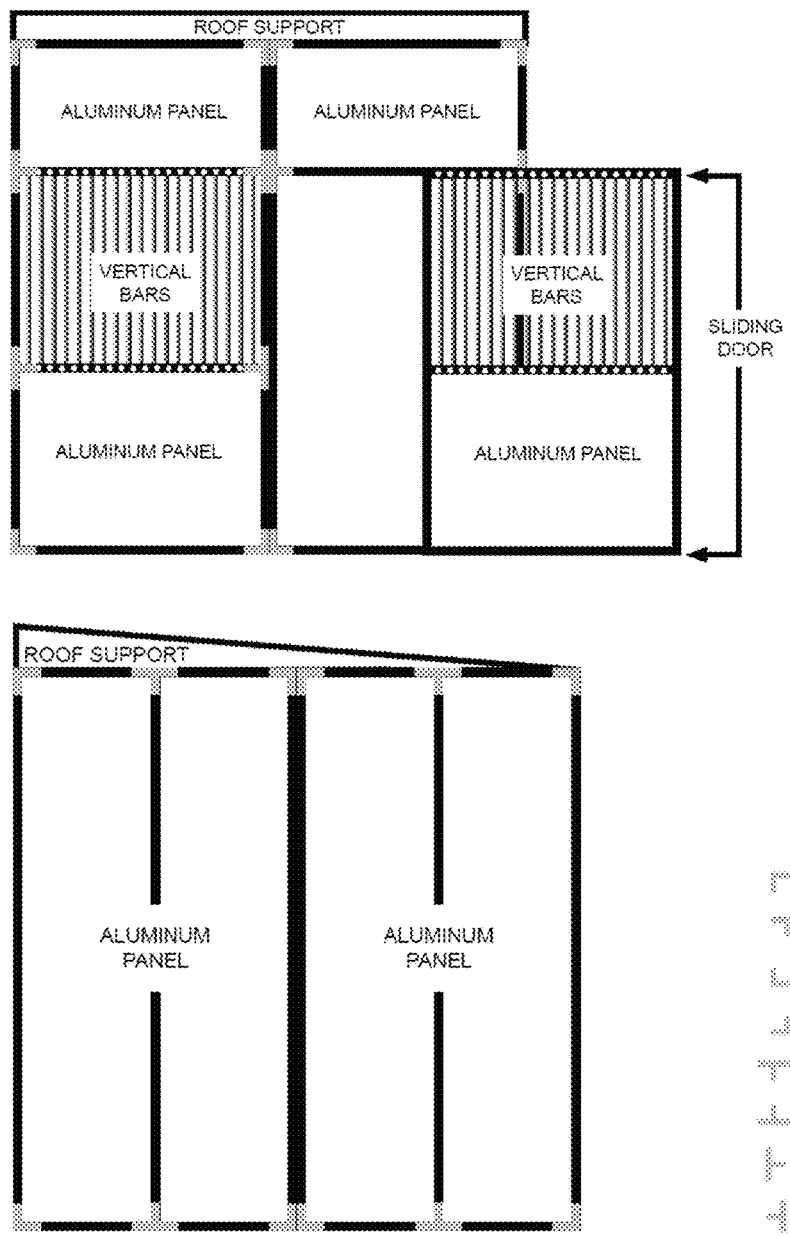
FIG. 2 is a series of depictions of assembly thereof where the top most depiction is a front sectional view of the assembly and the bottommost depiction is a left sectional view of the assembly, whereupon the sliding door is observed as well as several of the lesser roof panels.
Figure 3:
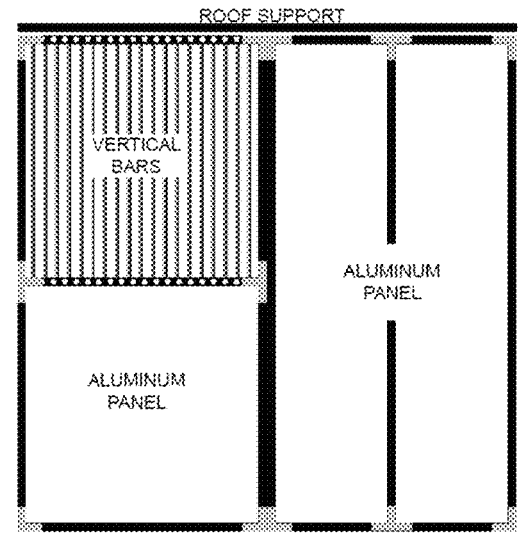
FIG. 3 is a series of depictions concerning the assembly thereof where the top most depiction is a rear sectional view of the assembly and the bottommost depiction is a right sectional view of the assembly whereupon the remainder of the lesser roof panels are observed.
Figure 3:
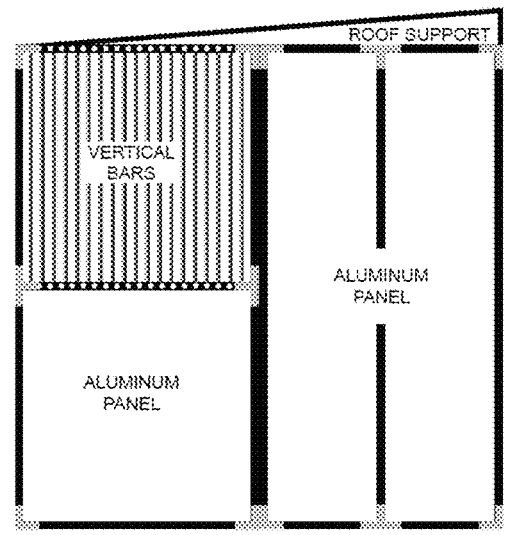

In reference to FIG. 2, the door unit would be of similar basal construction as the window and wall units, comprising a rectilinear perimeter structure of a rigid nature, upon which the universal fastening system would be located on at least two exterior and adjacent collections of surfaces totaling eight. The door unit would preferably possess a longitudinal height oriented dimension exceeding the lateral width oriented dimension with respect to the perimeter structure of the door unit. Whereupon the exterior surfaces thereof may engage with adjacent pluralities of components through the universal fastening system. The door unit would preferably be a sliding closure in operation though a hinged closure would also be permissible. Located at and affixed to the top, and optionally bottom lateral edges of the perimeter structure of the door unit is the door track or plurality thereof that would allow the door panel to be translated in a single degree freedom where the track may extend beyond the perimeter structure of the door unit to permit a complete exposure of the void in the perimeter structure. The door track may employ a locking mechanism to secure the domicile shut or otherwise may be located upon the perimeter structure and engaged with the door panel.

Adjacent to the door unit along the exterior planar surfaces and the adjacent pluralities of components is the door panel that may possess a separate perimeter structure of the door panel, or elsewise be constituted of a panel equivalent in geometry and scale to the perimeter structure of the door unit itself. The door panel would be operable and permit a translational motion to slide the door panel into a closed and open state with respect to the door unit. The door panel may further employ an optional locking mechanism to secure the domicile closed. Located at the top and optionally bottom edges of the door panel is the plurality of door rollers that would engage with the door track (or plurality thereof) to facilitate the sliding closure motion of the door panel. Located preferably near the top half of the door panel where a rectilinear aperture has been formed therein is the optional plurality of door bars that would operate similar to a window unit in allowing the exterior viewers to determine the conditions of the interior of the domicile prior to or while entering. The optional plurality of door bars would further preferably be arranged equidistant and parallel to one another within the door panel aperture.

Figure 6:
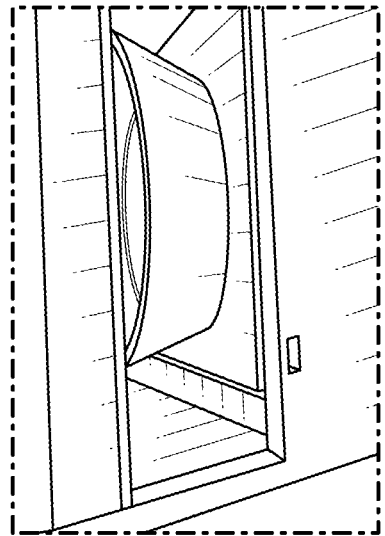
FIG. 6 is a series of depictions concerning the bath unit where the removable bath pan is observed on the bath platform in the left most depiction, the bath closure and bath panel are observed in the center depiction, and the bath panel is observed opening to the bath aperture and exposing the removable bath tub on the right most depiction.
Figure 6:
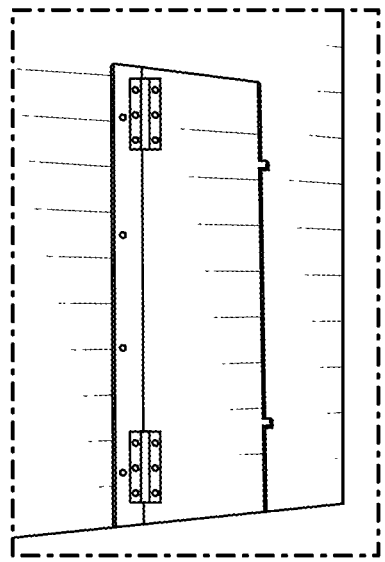
Figure 6:
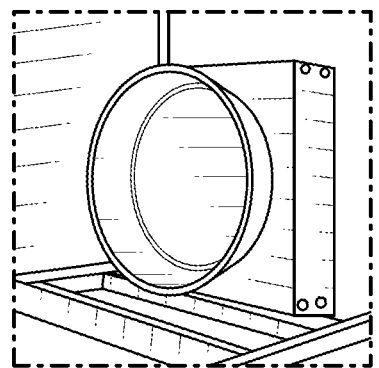

Pertinent to FIG. 6, perhaps the smallest in scale of the plurality of components is the bath unit, an optional component that would possess a similar rectilinear perimeter basal structure that would further still be possessed of the universal fastening system along at least four exterior surfaces of the perimeter structure of the bath unit. The bath unit would be a modular addition that would allow the occupant to be supplied an easily removable bath tub that is accessible from the exterior of the domicile through the bath closure. To be located on the interior of the domicile, the bath platform would elevate or support the removable bath tub (when located higher than the ground within the assembly), and would possess a topside surface at a height coincident with the bottom edge of the bath closure. The significance of which, would minimize the disruption of the occupants to carry out a necessary, sanitary operation and upkeep of the domicile. Loose but optionally possessed of a single aperture to coincide with a single protrusion or nub upon the top surface of the bath platform is the removable bath pan, a preferably curvilinear receptacle for housing liquid designated appropriate for bathing for the occupant, where food and water would be located elsewhere. The removable bath as the designation implies, would periodically see removal from the domicile for replacement, sanitization, and upkeep to ensure the occupant possessed a sanitary means of bathing.

Formed between the interior facing surfaces of the perimeter structure of the bath unit is the bath panel that would further preferably possess a rectilinear aperture equal to or greater than the lateral and longitudinal dimensions of the removable bath pan to permit removal thereof intermittently. Of a scale equal to or near greater than the aperture of the bath panel is the bath closure that would preferably be possessed of a hinged embodiment or otherwise sliding operation that would permit the full exposure and closure of the bath panel aperture. The bath closure would further preferably possess a handle or grip protruding from the bottom surface and may optionally possess spring loaded, or autonomous means of operation.

Figure 7:
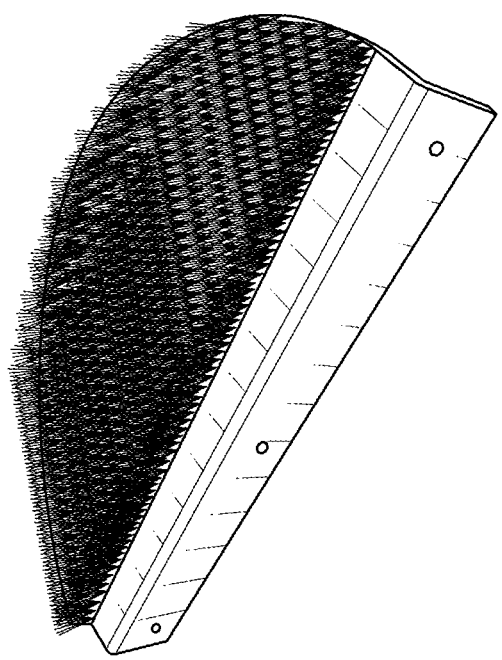
FIG. 7 is a series of depictions concerning the plurality of perch units where the leftmost depiction concerns the protrusion perch while the platform perch is observed in the right most depiction.
Figure 7:
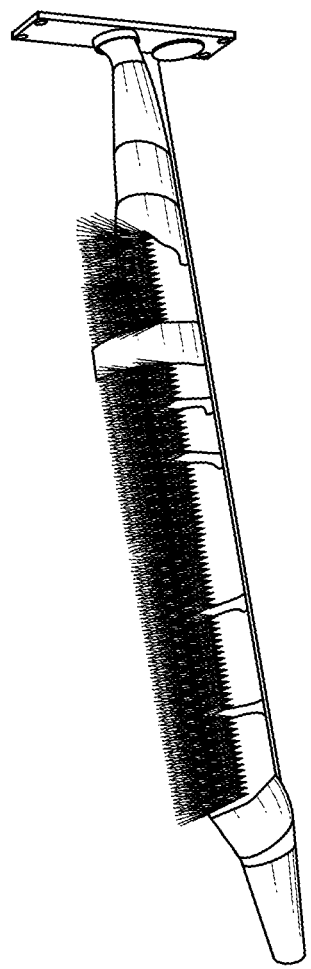

In reference to FIG. 7, though not possessed of a perimeter structure as the other plurality of components, the plurality of perch units would preferably come in two variants where both would engage with the universal fastening system located on the interior planar surfaces of the wall panel. The first of the plurality of perch units would be the protrusion perch unit that affixes to the interior surface of a wall panel through the universal fastening system, whereupon a protrusion would extend from the pro-perch fastening bracket and hang as a cantilever beam. Whereupon the protrusion perch unit may further possess a frictional coating or surface such as cloth, simulation foliage, or other such natural and organic surfaces. Engaging with the interior surface of a wall unit's wall panel through the universal fastening system and possessed likewise thereof is the pro-perch fastening bracket upon which the protrusion would extend therefrom to support the occupant. The second of the plurality of perch units would be the platform perch unit that would affix in a manner similar to the protrusion perch unit but engaging the universal fastening system possessed thereof along the horizontal dimensions.

Figure 8:
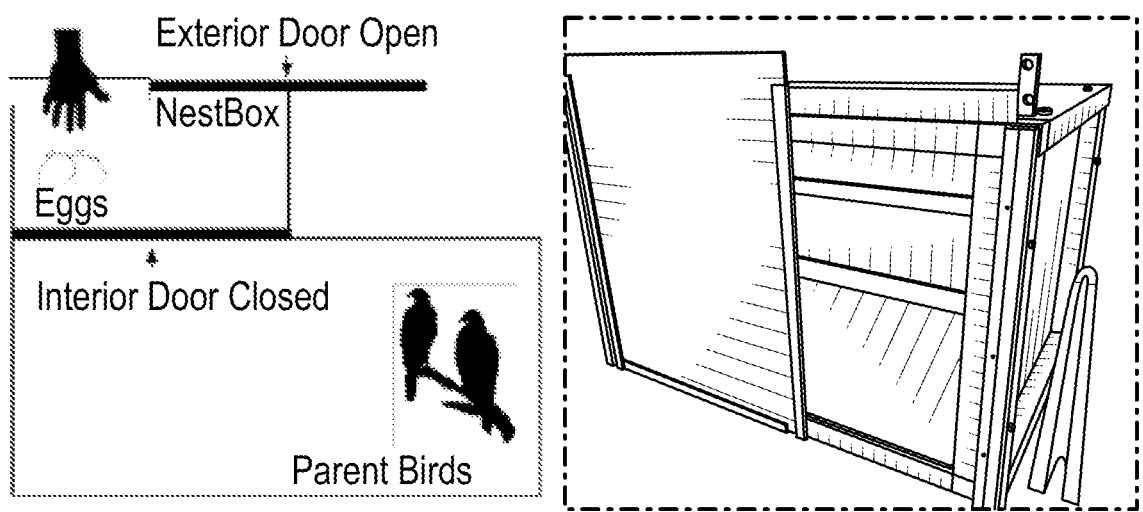
FIG. 8 is a series of depictions that illustrate the operation of the nesting unit where the left most depictions indicate the operation thereof and note the location of the plurality of nesting closures, while the right most depictions illustrate the protrusion from the domicile and the nesting closure tracks.
Figure 8:
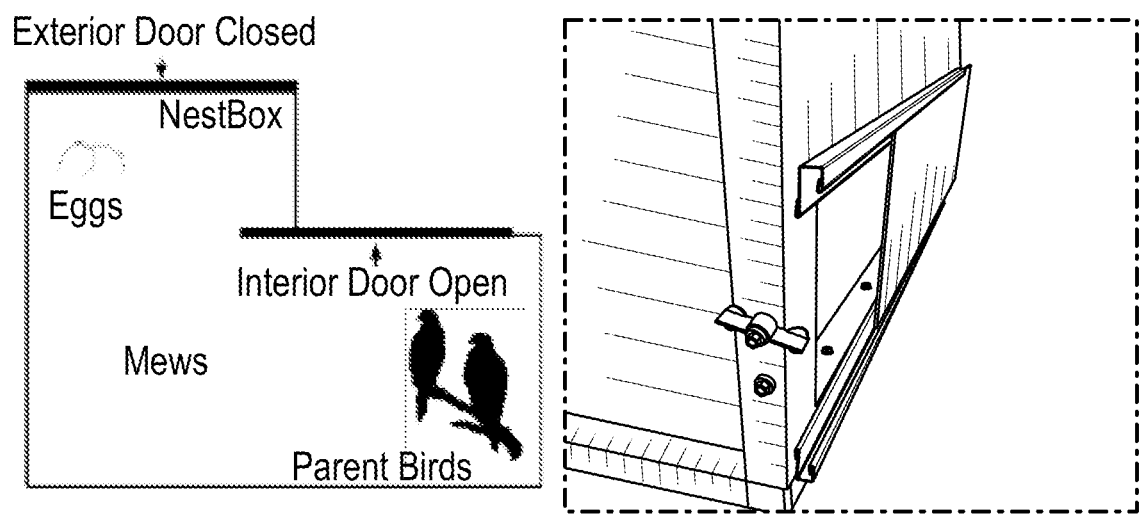

Particularly in reference to FIG. 8, affixed to the exterior of the domicile preferably is the nesting unit that would allow the observation of young housed therein. The nesting unit itself would be constituted of a recti linear housing that likewise employs a basal perimeter structure that employs at least four fastening points corresponding to the universal fastening system. The nesting unit would allow a plurality of nesting closures to be engaged either individually or simultaneously to allow examination of the contents within the nesting housing by sliding means. The nesting housing would be a hollow, rectilinear storage space that would permit the occupancy of a nest and any results of breeding by the occupant wherein the user may observe and examine the contents of the nesting unit through operation of the plurality of nesting closures to expose the interior and obstruct the view or interference of the occupant.

Located on opposing sides with one coincident to the plane of the adjacent parallel wall units is the plurality of nesting closures that may be slid along an individual nesting closure track. The plurality of nesting closure may be linked to operate simultaneously or individually and would further be possessed of a handle or grip to permit clasping thereof and thus ease of operation. Located on coincident planes as the plurality of nesting closures in an equal count of two is the nesting closure track (or plurality thereof), that corresponds to the individual nesting closure. The nesting closure track would run the length of the nesting unit beyond the span of the aperture on the two opposing sides of the nesting housing to permit full exposure and closure of the plurality of nesting closures.

Figure 9:
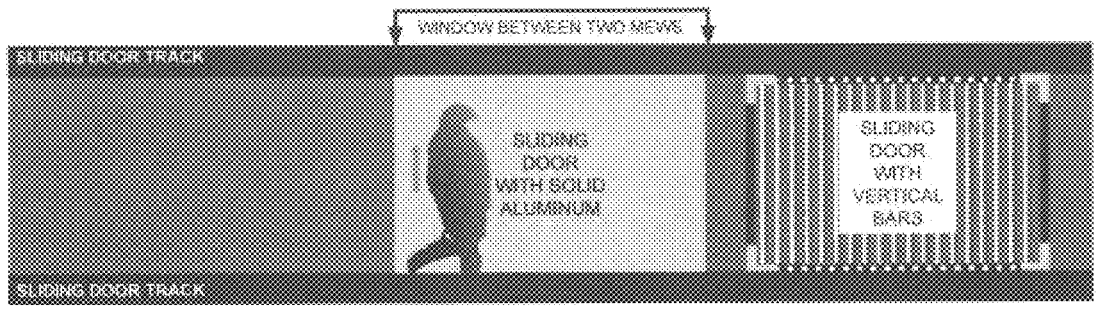
FIG. 9 is a series of depictions concerning the social engagement unit and the operation and stages thereof.
Figure 9:
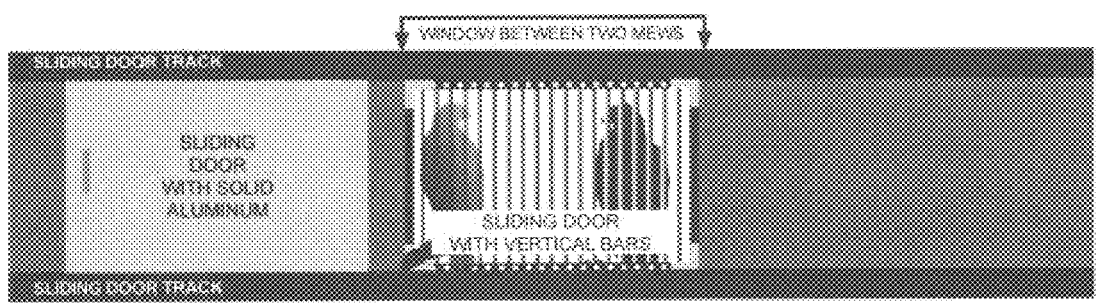
Figure 9:
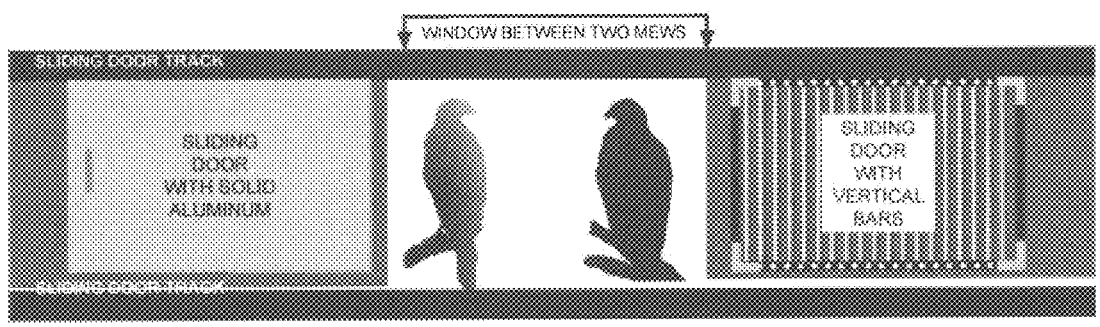

In reference to FIG. 9 in particular, intended to be employed where two separate domiciles meet along a coincident plane is the social engagement unit, the unit thereof otherwise permitting an adjustable means of interaction between close proximity domiciles. As majority of components before, the social engagement unit would possess a perimeter structure of the social engagement unit to allow engagement with the universal fastening system on at least four exterior facing surfaces. Located at the center of the social engagement unit is the social port that would be a preferably rectilinear aperture that would permit the occupants to pass freely through when opened and unobstructed by the plurality of sliding bars and social panel. The social track, similar to the door track and nesting closure track would permit the social panel and the plurality of sliding bars to slide along on a single track or pair thereof located along the top and bottom edges of the social engagement unit. The social panel and social panel grip may likewise possess a plurality of rollers respective to both that facilitate and ease the translational motion thereof. The structure engaged with the social track is the social panel that would provide an opaque rectilinear obscuring plate to eclipse the social port when engaged where the plurality of sliding bars would be off to the side. The social panel would be further possessed of a social panel handle or grip that would further ease the manipulation of the social panel. The second structure engaged to the social track would be the plurality of sliding bars that would offer a visual interaction and engagement of the occupants, but restrict physical passage thereof. Preferably, the plurality of sliding bars would be possessed of a plurality of equidistant parallel bars arranged along a longitudinal top and bottom basal bar that would themselves possess a plurality of rollers.

Figure 10:
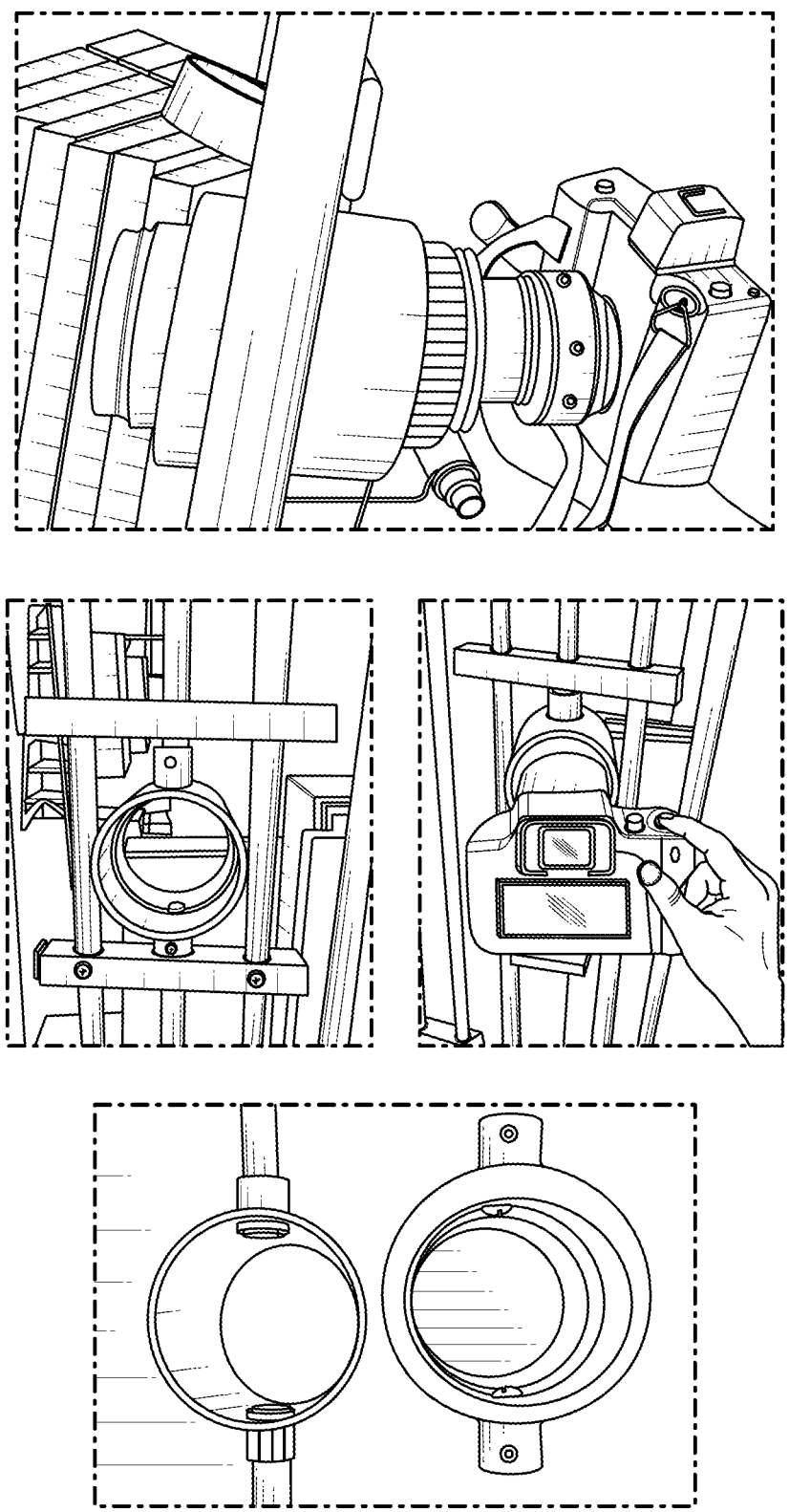
FIG. 10 is a series of depictions illustrating the observation unit in use with an observatory device in the upper most and mid right depictions, while the plurality of window protrusions is most evident in the middle two depictions and the observation barrel is best observed through the bottom most and middle left depictions.

In reference to FIG. 10, to better facilitate observation of the occupants from the exterior of the domicile, an optional observation unit may be employed that uses a structure similar to the wall unit where the center bar possesses a window bar void to allow seating of an observation barrel. Like the window unit, the observation unit would possess a plurality of window bars that preferably near exact in size, scale, and arrangement thereof and affixed to a similar perimeter structure. Preferably formed at the center of the central bar of the plurality of window bars of the observation unit is the window bar void that produces a substantial gap that would produce a top and bottom protrusion constituting the plurality of window protrusions. The plurality of window protrusions would be formed by nature of the window bar void where a top and bottom window protrusion would be present to allow seating and engagement with the plurality of observation apertures.

Disparate of the plurality of window bars is the observation barrel, a preferably curvilinear hollow cylinder that would allow the passage of an observatory device such as a camera, where the engagement of the plurality of window protrusions and observation apertures would permit the barrel to swivel in the horizontal direction. Located on the top and bottom of the observation barrel and preferably formed within two protrusions to mitigate disruption of the observatory device is the plurality of observation apertures. The plurality of observation apertures would engage with the plurality of window protrusions to allow the observation barrel to swivel and rotate in the horizontal direction while simultaneously allowing a view into the domicile, unimpeded by the plurality of window bars.

Figure 11:
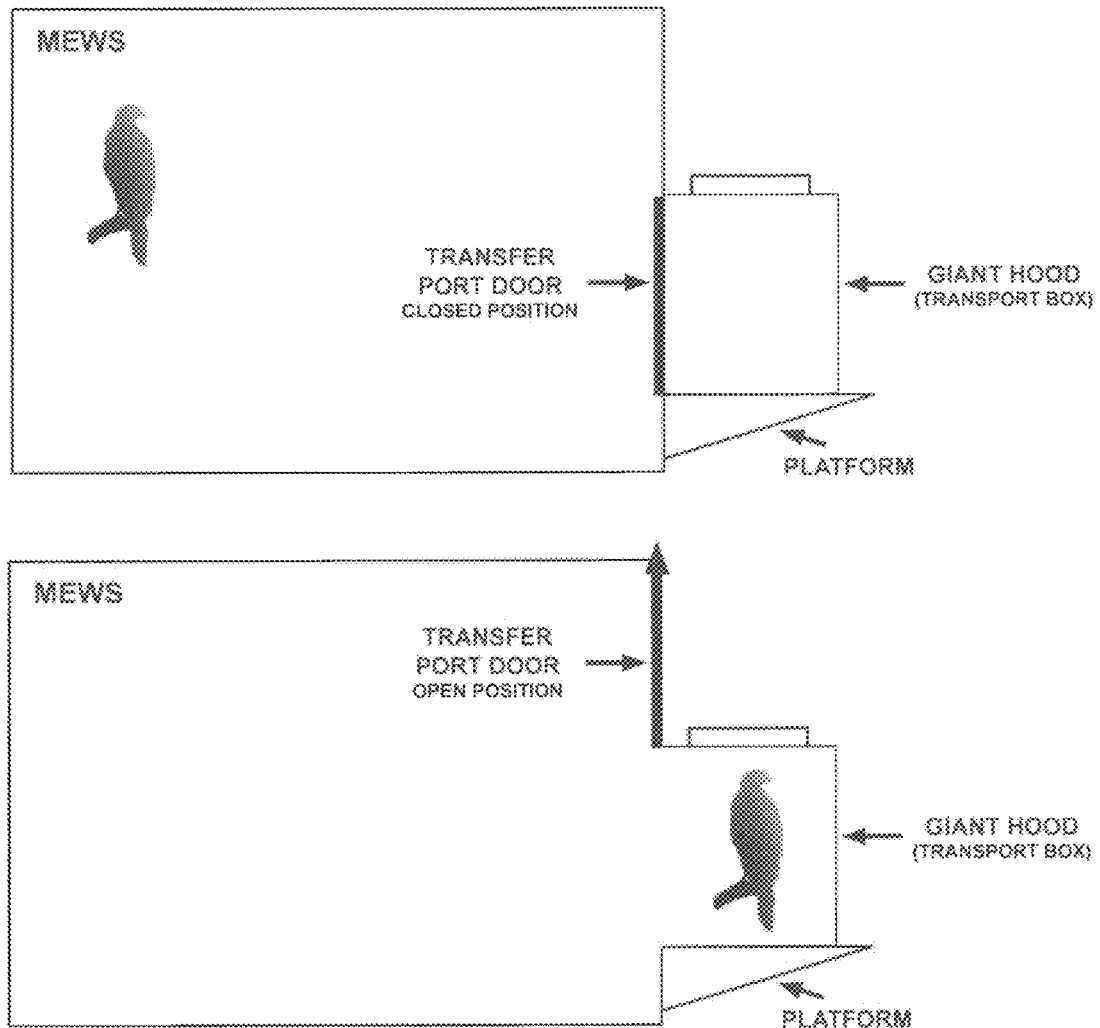
FIG. 11 is a series of depictions concerning the port unit and demonstrating the operation thereof where the port platform is observed beneath the transport box, and the port closure is located on the interior of the domicile.

In reference, particularly to FIG. 11, the port unit, an optional component, may be affixed within the domicile in a fashion similar to the majority of components through a rectilinear perimeter structure of the port unit operating under the universal fastening system on at least four exterior facing surfaces of the perimeter structure. The port unit would permit the controlled extraction of the occupant through a port aperture into a transport box that is rested atop a suspended port platform. Protruding from the exterior facing surface of the domicile is the port platform that would allow the transport box to be placed atop. The port platform would possess a top facing surface at a height coincident with the bottom edge of the port aperture and would be preferably suspended as a cantilever platform.

Formed around the rectilinear port aperture and spanning between the interior facing surfaces of the perimeter structure of the port unit is the port panel that would operate in function similar to a wall panel and further support the affixing and protrusion of the port platform. Preferably rectilinear in profile and spanning from a point coincident with the top surface of the port platform to a height near the height of the transport box is the port aperture. The port aperture would be sealable and exposed by the port closure and would otherwise permit the passage of the occupant from the interior of the domicile to the interior of the transport box. Preferably constituted of a scale near or greater than the port aperture and accessible from the interior of the domicile is the port closure that may slide open and shut along a track to allow passage of the occupant where a transport box is awaiting on the other side, and restrict such passage otherwise. The port closure may further possess a handle or grip to facilitate ease of operation in lifting and closing the structure and may further employ locks, springs, and other conventional conveniences to facilitate security and ease of use. Finally, a transport box may be employed, disparate of the domicile but ancillary to the port unit where the transport box would possess a height and width near or greater than the port aperture to contain the occupant upon passage through the port aperture. The transport box would be intended to rest upon the port platform when in use and may be immediately removed therefrom upon successfully housing the occupant.

Figure 12:
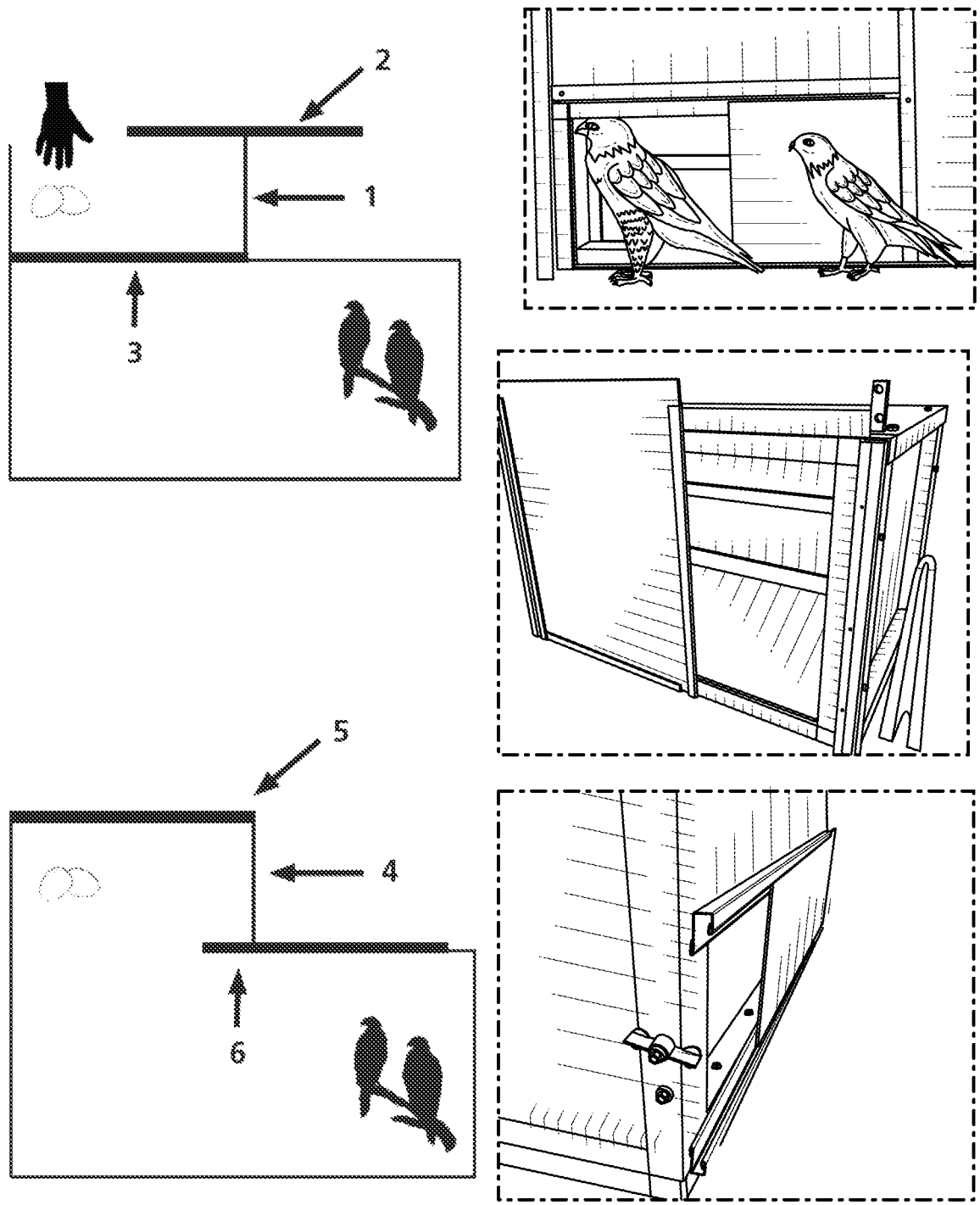
FIG. 12 illustrates a nesting box module attached to the main housing area, separated by a sliding door shown open and closed.

FIG. 12 illustrates a nesting box module attached to the main housing area, separated by a sliding door shown open and closed.

Although the invention has been explained in relation to its preferred embodiment, it is to be understood that many other possible modifications and variations can be made without departing from the spirit and scope of the invention.

What is claimed is:

1. A modular apparatus for housing animals comprising a plurality of units, the plurality of units comprising:
   a wall unit;
   a window unit;
   a roof unit;
   a skylight unit formed coincident with the roof unit and coupled to a number of portions of an exterior perimeter of the modular apparatus, said skylight unit comprising a porous mesh fluidly connecting a portion of an interior of the modular apparatus to an environment exterior to the modular apparatus;
   a door unit of sufficient size to enable a person to enter into the modular apparatus;
   a bath unit;
   an observation unit; and
   a port unit,
   wherein the plurality of units are releasably coupled to one another to form a housing suitable for animals,
   wherein said animals include avian species,
   wherein a basal structure of each of said units is rectilinear,
   wherein the roof unit is coupled to all portions of the exterior perimeter of the modular apparatus to which the skylight unit is not coupled, and
   wherein the roof unit and skylight unit are disposed above all other units in the plurality of units.

2. The apparatus of claim 1 wherein said units are modular and can be assembled in a desired location to form the housing and can be disassembled from each other and reassembled in a second desired location.

3. The apparatus of claim 1 adapted for housing raptors.

4. The apparatus of claim 1 further comprising a nesting unit and a residence area, the nesting unit separated from the residence area by a sliding door.

5. The apparatus of claim 1 further comprising a breeding module suitable for a pair of avian species to reside while breeding.

6. The apparatus of claim 1 further comprising a bath pan unit.

7. The apparatus of claim 1 further comprising a protrusion perch.

8. The apparatus of claim 1 further comprising a roof unit which is oriented at an angle, adapted to mitigate the collection of water and snow.

9. The apparatus of claim 1 wherein the skylight unit is adapted to permit passage of sunlight, rain, snow, and seasonal debris.

10. The apparatus of claim 1 comprising a sliding or hinged door unit.

11. The apparatus of claim 1 wherein said units are modular and can be assembled in a desired location to form the housing and can be disassembled from each other and reassembled in a second desired location; comprising a nesting unit and a residence area, the nesting unit separated from the residence area by a sliding door; comprising a breeding module suitable for a pair of avian species to reside while breeding; comprising a bath pan unit; a protrusion perch; a roof unit which is oriented at an angle, adapted to mitigate the collection of water and snow; wherein the skylight unit is adapted to permit passage of sunlight, rain, snow, and seasonal debris.

12. The apparatus of claim 1 wherein the avian species is one or more raptors.

13. The apparatus of claim 1 wherein the avian species is poultry.

* * * * *